United States Patent
Carroll et al.

(10) Patent No.: US 7,353,429 B2
(45) Date of Patent: Apr. 1, 2008

(54) SYSTEM AND METHOD USING HARDWARE BUFFERS FOR PROCESSING MICROCODE TRACE DATA

(75) Inventors: Walker B. Carroll, Waltham, MA (US); Douglas J. Joseph, Danbury, CT (US); Gabriel M. Tarr, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 619 days.

(21) Appl. No.: 10/920,530

(22) Filed: Aug. 17, 2004

(65) Prior Publication Data

US 2006/0041791 A1 Feb. 23, 2006

(51) Int. Cl.
*G06F 11/00* (2006.01)

(52) U.S. Cl. .................................................. 714/38

(58) Field of Classification Search ................. 714/37, 714/39, 47, 30, 27, 42, 38, 45
See application file for complete search history.

(56) References Cited

U.S. PATENT DOCUMENTS

| | | | | |
|---|---|---|---|---|
| 6,134,676 | A * | 10/2000 | VanHuben et al. | 714/39 |
| 6,154,857 | A * | 11/2000 | Mann | 714/30 |
| 6,243,836 | B1 * | 6/2001 | Whalen | 714/45 |
| 6,834,360 | B2 * | 12/2004 | Corti et al. | 714/37 |
| 7,058,790 | B2 * | 6/2006 | Barry et al. | 712/17 |

* cited by examiner

*Primary Examiner*—Nadeem Iqbal
(74) *Attorney, Agent, or Firm*—Lily Neff

(57) ABSTRACT

Debugging microcode is facilitated by a hardware assist that takes over from the microcode the basic management of handling the data for a trace entry, thereby reducing the load on the microcode to a single micro-instruction per trace operation and thereby permitting more trace points to be included in the microcode shipped to the field.

19 Claims, 2 Drawing Sheets

```
           INSTR (N-2)
           INSTR (N-1)
       ⎧   IF (TFLG) WRITE A
   415 ⎨   IF (TFLG) WRITE C
       ⎩   IF (TFLG) WRITE K
           INSTR (N)
```

SYSTEM AND METHOD USING HARDWARE BUFFERS FOR PROCESSING MICROCODE TRACE DATA

TECHNICAL FIELD

The field of the invention is that of debugging microcode in data processing systems.

BACKGROUND OF THE INVENTION

Ever since the earliest days of programming, it has been necessary to perform tracing; i.e. feeding into the program data that are known to produce certain results and then tracing the progress of the data and intermediate results through the calculation to identify errors.

In applications programming, such as an income tax calculation, the test data might be a sample income, deductions and expenses, with the contents of the program data being tested to determine if the deductions are calculated correctly Many programs have a very large number of paths that may be taken, depending on the particular input parameters, and it can be very difficult to identify the source of an error.

The foregoing supports an argument for embedding extensive test facilities when a program is written, such as placing optional print statements or other instructions to make visible intermediate results that are ordinarily not revealed, in order to reduce the time required to debug the errors that will inevitably be made.

In current technology, the integrated circuits that perform data processing operations have several levels of integration and intermediate data in a calculation are often not available on external pins.

On the other hand, the presence of such debugging features requires that the processor execute instructions that are not ordinarily used and therefore reduce the performance of the program.

Those skilled in the art will appreciate that, in some cases, extensive debugging instructions will not reduce program performance because the program performance is limited by some other factor, such as disk access.

In a class of cases, the program operation does depend on speedy execution of instructions and the presence of debugging instructions will have a noticeable effect on system performance.

In the particular case of microcode, the performance of the system in question is usually rather sensitive to the speed of execution because the performance of the microcode affects the execution speed of all the applications programs.

FIG. 2A illustrates in highly simplified form a portion of microcode that contains trace instructions of a first type. This example is presented for the purpose of illustrating one possible approach and is not intended to be realistic or an illustration of proper programming practice.

Instr(N−2) represents a conventional microcode instruction;

Instr(N−1) represents a second conventional microcode instruction

Go to Trace represents a transfer of control to a subroutine 410, denoted at the bottom of the Figure, that collects data that is useful in detecting errors and prints or stores them, after which control resumes at the next conventional microinstruction. (The term "GoTo" is not machine language, of course, but is pseudo-code used for purposes of illustration.)

Instr(N) represents another conventional instruction

The second Go to Trace transfers control to the same location, so the data printed or stored will be the same.

Instr(N+1)

Instr(N+2) continue the microcode.

In this example, the use of a subroutine avoids duplication of the data transfer and storage step, at the cost of imposing a fixed set of data to be disclosed. In some cases, the data might be insufficient, and in others it might be excessive. The transfer to the subroutine takes time and machine cycles. A conditional transfer, (by inserting an AND gate keying on a debug flag in the hardware chain that carries out the transfer, or any other convenient method) would take less time, but still impose some overhead on the code. Those skilled in the art will also realize that use of a subroutine imposes additional penalties in terms of resource usage and cycles to transfer control.

Various modifications that impart flexibility will be evident, as will the conclusion that this approach consumes many machine cycles and runs the risk of slowing down system performance.

An alternative method is illustrated in FIG. 2B, in which a series of conditional write statements 415 are inserted in the flow of ordinary instructions. In this case, the data to be passed on for inspection may be varied at each trace point, since they are explicitly set out. The conditional nature of the debugging instructions is an option, since a simple transfer within the CPU will usually take no more time than testing for the condition, so there is no time to be saved by the conditional instructions.

The write statements illustrated are more complex than appears. In this art, the microcode must maintain the area it is writing into, and illustratively uses registers to store head/tail pointers, and in addition to doing the write, must do the pointer management. The "write" illustratively consists of 3 or more instructions.

This second method offers greater flexibility at the cost of more programming effort. Which of the two approaches will slow down the microcode more will depend on many factors.

It has happened that the amount of debugging instructions inserted in the microcode during the initial test period caused such a slowing of performance that it was removed from the version shipped with production models of the system. Unfortunately, difficulties with particular applications then required that software patches be written and sent to the customer to address particular issues.

The art could benefit from a method of trace debugging and debugging system that permitted an extensive scrutiny of the system during operation, in order to provide satisfactory debugging, but still loaded down the system sufficiently little that the debugging instructions could be left in the production code.

SUMMARY OF THE INVENTION

The invention relates to a method of debugging microcode that provides a hardware assist to the trace process.

A feature of the invention is the use of a microcode write instruction to transfer debugging data to a hardware queue.

Another feature of the invention is the use of hardware to load data selected by the microcode into a hardware buffer for debugging.

DETAILED DESCRIPTION

Figure 1:
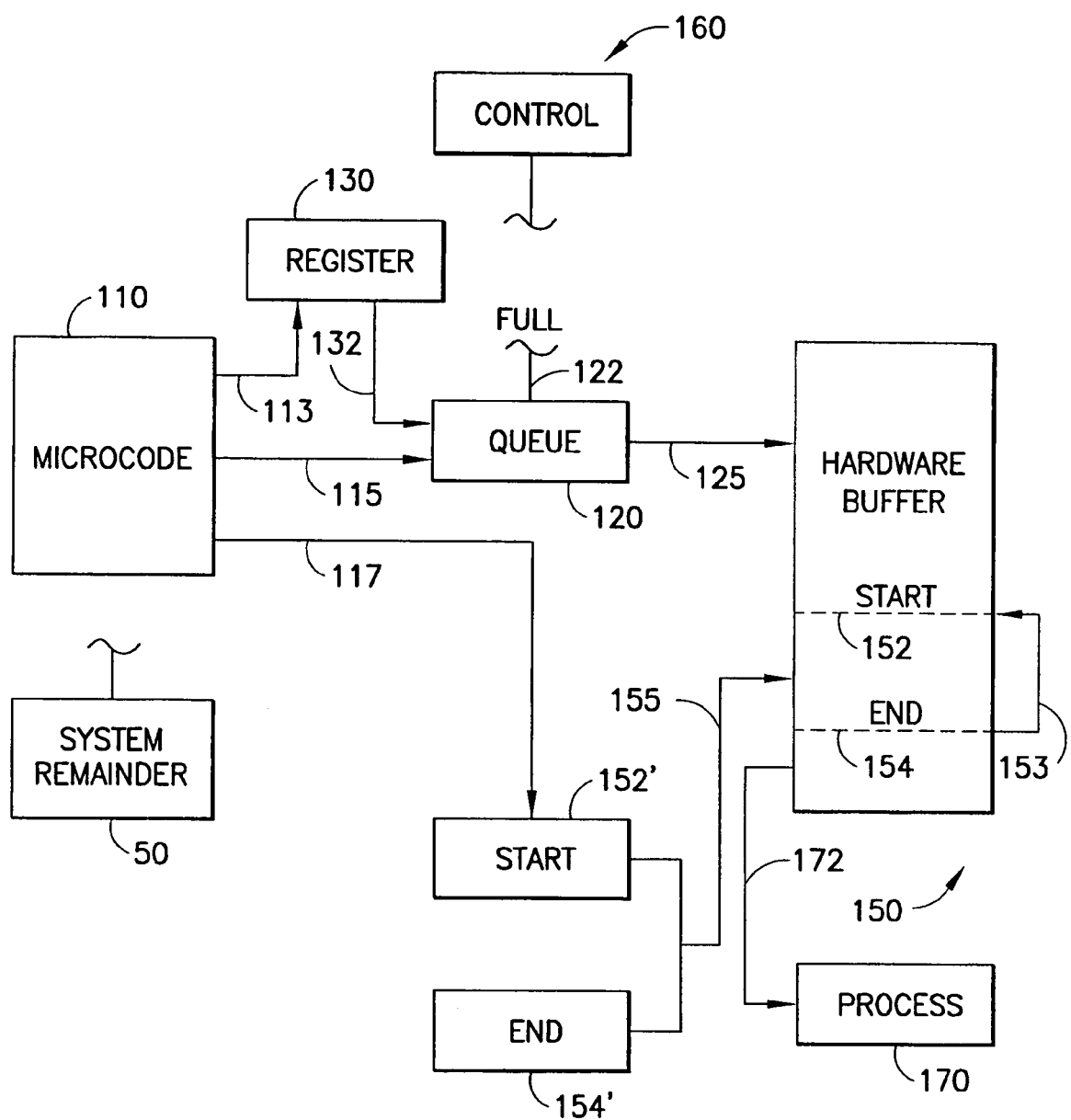
FIG. 1 illustrates a portion of a system using the invention.
Figures 2A, 2B:
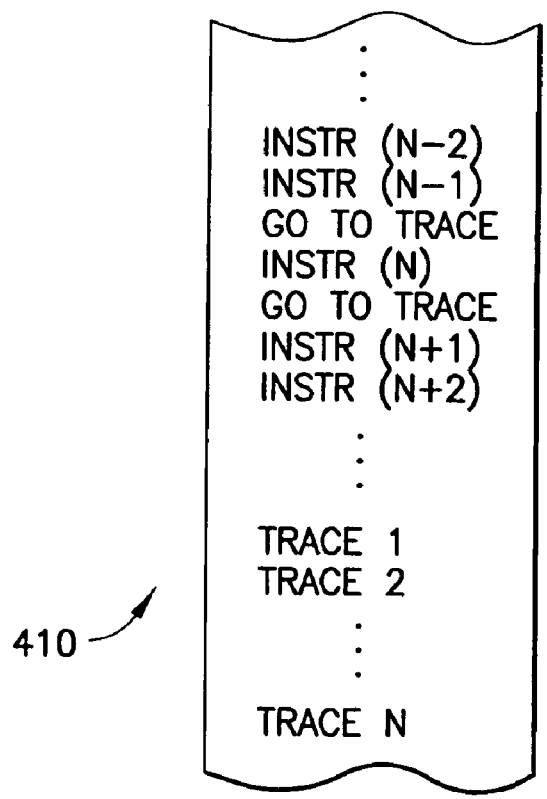
FIGS. 2A and 2B illustrate simplified examples of prior art methods of tracing.

FIG. 1 illustrates a portion of a data processing system containing logic blocks related to the invention. Other conventional blocks such as memory, ALU, Input/Output, et cetera are shown schematically by block 50 which represents the remainder of a system, such a general purpose computer, special-purpose system such as a digital signal processor, etc. On the left, block 110 represents microcode that performs its usual function of running the system as well as the functions related to the invention.

The microcode contains a set of trace instructions according to the invention that consist of (one or more) write statements that transfer data from various registers, memory locations and the like (denoted generally by block 130) to hardware queue 120. Queue 120 is preferably memory mapped so that the data physically resides in a memory array, but appears to the microcode to be a register.

Illustratively, queue 120 will be a FIFO buffer with hardware taking over from the microcode the overhead.

Line 113 represents symbolically the hardware that sends commands to the storage locations 130 and line 132 represents the paths from the storage to queue 120. Those skilled in the art will appreciate that the sequence of operations involved in transferring the contents of the adder, say, to another location such as the hardware queue will vary from one system to another and are well established in the field. The number of clock cycles required for the transfer will also depend on the system and on the data location from which the transfer is made.

Preferably, the queue is not a portion of system memory, but is an on-chip (local) memory array (with associated controls that give it FIFO behavior) dedicated to this trace function.

According to one version of the invention, special paths for this trace data transfer will be constructed in addition to the ones used in normal operation in order to reduce the number of cycles required for the transfer and/or the various transfer operations will take place simultaneously.

Thus, the path to the queue does not interfere with execution of the next microinstruction, so no time is lost by the transfer to the buffer.

Path 132 will preferably be consistent with the rest of the integrated circuit design. If the layout is structured, with data traveling between locations over various buses, then path 132 will include using a dedicated point-to-point bus. If the layout is random logic, path 132 will be laid out the same way. In either case, path 132 is used only for this trace function. If path 132 is shared with other system components, the operation of the other components might interfere with tracing.

The size of hardware queue 120 may vary according to a tradeoff between the amount of space and other resources required and the cycles lost if processing has to be suspended if the queue is full when a transfer is required. Optionally, a full flag 122 is set when the queue system is full and suppresses further transfers until the queue again has space.

The transfer from registers 130 to queue 120 is performed under control of a single microinstruction, referred to as a trace microinstruction, according to conventional practice in carrying out microinstructions; i.e. the sequence of operations is generally the same as that when a multiplier or adder is loaded.

The subsequent transfer, between queue 120 and hardware buffer 150 is carried out over line 125 and under control of trace control block 160. Trace control block 160 may be constructed in many forms and will contain sequentially operating hardware that forms a path between the queue 120 and buffer 150 and transfers the trace data into a place in the buffer. Such hardware is routinely used in systems to carry out move and other transfer commands. Illustratively, the path(s) taken by trace data to queue 120 is dedicated and the path from the queue to the buffer 150 is shared.

The identification of the next available location(s) in buffer 150 (e.g. the FIFO operation) and the movement of the current data to that location are all done with hardware, rather than the system microcode. Optionally, the sequence may be implemented with stored instructions that are similar to (but separate from) the system microcode.

An advantageous feature of the invention is that the detailed steps of establishing a path to the next open slots in the buffer and actually carrying out the transfer do not consume any space in the microcode array or any clock cycles.

Illustratively, buffer 150 is a normal part of the system that is used in part for debugging. A portion of buffer 150 during debugging has a defined start location 152 and an end (or stop) location 154, the addresses or other identifying indicia of both of which are stored in buffer control register 152' and 154'. Buffer 150 is a wrap-around buffer, as indicated by line 153. Illustratively, the start and end locations are ignored during normal operation and the whole of buffer 150 is used for system operation.

These registers 152' and 154' are microprogrammable and contain a location address that is written into by microcode 110 over line 117 and may be changed during system operation. Line 155 indicates symbolically that the start and end locations of buffer 150 are written to and changed by registers 152' and 154'.

Those skilled in the art will appreciate that any delay caused by the trace process in executing the next system microinstruction will slow down system performance. It is an advantageous feature of the invention that the transfer between queue 120 and buffer 150 can proceed simultaneously with the next system microinstruction, since the hardware assist components are dedicated to the trace function and are not needed by other operations.

At a convenient time, the trace data in buffer 150 will be processed by process block 170, reaching block 170 on line 172. The term "processing" is used generally here to indicate conventional debugging operations such as printing out or displaying the trace data to be compared by a programmer with the expected data or by any of a number of automated comparisons, as by an applications program that inserts a test vector into appropriate input location and performs successive comparisons on the contents of various registers and memories as the data passes through the system. Such processing may be performed by stored program operation or by hardware.

The sequence of steps in the trace process may be summarized as:

execute microcode;

execute a trace microinstruction that transfers data from various storage locations to a hardware queue
   a. the data will change at various steps in the program
   b. the time/cycles will be about the same as loading an adder
   proceed with the microcode while a. simultaneously the hardware assist mechanism transfers the trace data to the buffer and processes the trace data.

Thus, the trace operation employs a hardware assist in which dedicated (and/or multi-use) hardware takes over part of the job of collecting trace data and processing it. The result is that the burden on the microcode to support trace operations is reduced and the number of clock cycles required for debugging operations is reduced compared with a system that performs the same functions through microcode. With this reduction, the number of trace points that may be tolerated in the microcode that is shipped in production versions of the system is increased over what it would otherwise be.

While the invention has been described in terms of a single preferred embodiment, those skilled in the art will recognize that the invention can be practiced in various versions within the spirit and scope of the following claims.

What is claimed is:

1. A method of storing trace data in a data processing system controlled by microcode comprising the steps of:
   executing a microinstruction in said microcode that writes a selected subset of trace data to a hardware queue;
   copying said selected subset of trace data under hardware control from said hardware queue to a hardware buffer in which said hardware buffer stores at least two subsets of said trace data; and
   processing said subset of trace data.

2. A data processing system controlled by microcode comprising:
   a CPU
   a set of microcode comprising a set of microinstructions including at least one microinstruction for writing a selected subset of trace data to a hardware queue;
   control means for copying said selected subset of trace data under hardware control from said hardware queue to a hardware buffer; and
   said hardware buffer having means to store at least two subset of said trace data.

3. A data processing system according to claim 2, further comprising means for processing said subset of trade data.

4. A data processing system according to claim 2, in which said hardware buffer is a wrap-around buffer with a start point and an end point set by stored start data and end data in a buffer dimension register that is programmable by said microcode, whereby the dimension of said buffer is controlled by said microcode.

5. A data processing system according to claim 2, in which said hardware queue includes an indicator that is set by said hardware to a full value when said hardware queue is full.

6. A data processing system according to claim 3, in which said hardware queue includes an indicator that is set by said hardware to a full value when said hardware queue is full.

7. A data processing system according to claim 2, in which said control means for copying said selected subset of trace data to said hardware buffer is controlled automatically without input from said microcode.

8. A data processing system according to claim 3, in which said control means for copying said selected subset of trace data to said hardware buffer is controlled automatically without input from said microcode.

9. A data processing system according to claim 2, in which said hardware queue is mapped to a memory away such that identification of a next location to be written to is controlled by hardware.

10. A data processing system according to claim 2, in which said hardware queue operates as a FIFO buffer.

11. A data processing system according to claim 2, in which said trace data follow at least one dedicated path to said hardware queue.

12. A data processing system according to claim 2, in which said trace data follow at least one dedicated path to said hardware queue.

13. A method according to claim 1, in which said hardware buffer is a wrap-around buffer with a start point and an end point set by stored start data and end data in a buffer dimension register that is programmable by said microcode; and said microcode executes a step of writing said end point and said start point in said buffer dimension register at least once, whereby the dimension of said buffer is controlled by said microcode.

14. A method according to claim 1, in which said hardware queue includes an indicator that is set by said hardware to a full value when said hardware queue is full.

15. A method according to claim 13, in which said hardware queue includes an indicator that is set by said hardware to a full value when said hardware queue is full.

16. A method according to claim 1, in which said step of copying said selected subset of trace data hardware buffer is controlled automatically by hardware control means without input from said microcode.

17. A method according to claim 13, in which said step of copying said selected subset of trace data to said hardware buffer is controlled automatically by hardware control means without input from said microcode.

18. A method according to claim 14, in which said step of copying said selected subset of trace data to said hardware buffer is controlled automatically by hardware control means without input from said microcode.

19. A method according to claim 15, in which said step of copying said selected subset of trace data to said hardware buffer is controlled automatically by hardware control means without input from said microcode.

* * * * *